Patented May 25, 1943

2,320,181

UNITED STATES PATENT OFFICE 2,320,181

METHOD FOR THE PRODUCTION OF CAPILLARY ACTIVE AGENTS

Winfrid Hentrich, Dusseldorf-Reisholz, Alfred Kirstahler, Dessau in Anhalt, and Fritz Schlegel, Dusseldorf, Germany; assignors, by mesne assignments, to "Unichem" Chemikalien Handels A.-G., Zurich, Switzerland, a corporation of Switzerland No Drawing. Application July 7, 1938, Serial No. 217,952. In Germany July 10, 1937

6 Claims. (Cl. 260—458)

It has been found that valuable capillary active agents are obtainable by converting higher molecular organic hydroxyl-, mercapto- or amino-compounds of the aliphatic, cycloaliphatic or aliphatic-aromatic series containing one lipophile group in the molecule, with reactive halogen ketones, by then reducing the keto group in the formed condensation-product to the secondary alcohol group and by transforming the latter into a group having the property of imparting water solubility.

By lipophile group we mean especially higher aliphatic groups with no less than 6 C atoms or mixed aliphatic-cycloaliphatic or aliphatic-aromatic groups respectively with no less than 8 C atoms which may finally be interrupted by oxygen, sulfur or nitrogen.

As compounds of the aliphatic series containing hydroxyl-groups we may for the present invention consider e. g. primary, secondary and tertiary alcohols of a straight or branched chain and particularly the higher molecular aliphatic alcohols such as are obtainable by reduction and especially by catalytic hydrogenation from fats or waxes respectively of a vegetable, animal or mineral origin. Besides same we may employ those higher molecular alcohols which are obtained by oxidation of organic materials such as mineral oils, paraffin oils, paraffin and the like, or also those aliphatic alcohols the hydrocarbon chain of which may be synthetically formed such as higher molecular alcohols from methanol-synthesis.

As initial materials for the present method we may use e. g. hexyl-alcohol, octyl-alcohol, dodecyl-alcohol, octadecyl-alcohol, docosyl-alcohol, montanyl-alcohol and the like, further unsaturated alcohols and those which possess hydroxyl groups such as linseedoil-, wood-oil-and castoroil-alcohol, further alcohols containing hetero-atoms such as batyl- and selachyl-alcohol, or synthetic products of same nature such as dodecyl-glycol ether, tetradecyl-thio-glycerine ether, N-oxyalkylated higher aliphatic or cycloaliphatic amines. These alcohols may be employed either alone or mixed with one another and especially in the form of such mixtures as are obtained by the reduction of naturally occurring materials, e. g., of cocoanut- and palmkerneloil, of sperm oil and other sea-animal oils.

As cycloaliphatic alcohols for the present method the resinic alcohols gained by catalytic hydrogenation from natural resins and resinacids are primarily to be considered such as colophony-, dammar- or copal-resin-alcohol, further naphthenic alcohols obtained by catalytic hydrogenation of the naphthenic acids, as well as alkylated phenols, naphthols and the like, the aromatic hydrocarbon groups of which are saturated with hydrogen. The aliphatic as well as the cycloaliphatic alcohols may contain also other known atoms or atom groups such as halogen, oxygen, sulfur or nitrogen or their wellknown combinations respectively.

Instead of the indicated aliphatic or cycloaliphatic hydroxyl compounds we may, as initial materials, also employ the corresponding mercapo- or amino-compounds i. e. compounds of the above-described sort which instead of the hydroxyl groups contain mercapto- or amino- or substituted amino-groups respectively (substituted on the nitrogen).

The fatty aliphatic-hydroxyl compounds contemplated by the present invention as initial agents have the general formula R—Ar—OH, where R means one or several aliphatic, cycloaliphatic or aliphatic-aromatic residues, and Ar an aromatic residue. As aliphatic residues there are to be considered, e. g., propyl-, amyl-, octyl-, dodecyl-, hexadecyl-residues, etc., or branched chains such as isopropyl-, the various isohexyl-, isodecyl-, isotetradecyl-, iso-octadecyl and the like or, respectively, groups with tertiary carbon atoms such as the tertiary butyl-, tertiary amyl-, di-isobutyl-, tri-isobutyl-, tertiary ethyl-hexyl group. Among the cycloaliphatic or fatty aromatic groups there are, e. g., cyclohexyl- or alkyl-cyclohexyl groups, the tetrahydro- and the decahydro-naphthyl residue, the benzyl-, the menaphthyl- and the tetrahydro-menaphthyl residue. The groups represented by the radical R may also contain other atoms or atom groups such as halogen, oxygen, sulfur or nitrogen or, respectively, their wellknown combinations.

The radical Ar is an aromatic group such as the radical of benzol, toluol, xylol, naphthalen, phenanthren, anthracene, diphenyl, diphenyl-ethane, diphenyl-methane, phenyl-naphthyl-methane and the like. These groups may in turn be substituted by hydrocarbon groups of various kinds, e. g., methyl- or ethyl-groups connected either directly or through an oxygen- or sulfur-atom. Moreover they may contain halogen-, hydroxyl-, nitrogen-groups and the like as substituents.

The organic hydroxyl-compounds of the general formula R—Ar—OH are obtained by the condensation of primary, secondary or tertiary alcohols or their mixtures or, respectively, of the olefins corresponding to these alcohols with aromatic components such as phenols, naphthols and the like. The condensation is performed in a way known in itself by co-employing suitable catalysts such as inorganic acids, metal-halides, boron-fluoride and its additive products, surface-catalysts and the like.

In the production of these hydroxyl-compounds we may employ initial materials which are in part supplied by technical operations on a large scale, e. g., the higher molecular aliphatic alcohols obtained by reduction from vegetable, animal or mineral fats or waxes or; respectively, the naphthenic alcohols, the resin-alcohols obtainable by reduction from natural resins and resin-acids; further pentyl-methyl-carbinol, β-ethyl-butyl-alcohol, β-ethyl-hexyl-alcohol, β-butyl-octyl-alcohol, methyl-isobutyl-carbinol, oil of turpentine, pine-oil, alcoholic and olefinic products resulting from the carbonization of wood, second runnings from methanol-synthesis; and olefinic products of lignite-distillation, of the cracking of petroleum and paraffins as well as of the benzine-synthesis.

The aromatic hydroxyl-compounds alkylated in the nucleus with a straight alkyl-chain by a series of steps involving esterifying carbonic acids or their derivatives with aromatic hydroxy-compounds, re-arranging the esters in a well known way to the corresponding hydroxy-aryl-ketones and eventually transforming therein the ketone group by reduction to a methylene group.

Instead of the indicated aliphatic-aromatic hydroxyl-compounds we may also employ as initial materials the corresponding mercapto- or amino-compounds, i. e., compounds of the above described sort and bearing mercapto- or amino-groups or substituted amino-groups respectively (substituted on the nitrogen) instead of the hydroxyl-groups.

The reactive halogen-ketones which according to the present invention are to be converted with the higher molecular hydroxyl-, mercapto- or amino-compounds containing a lipophile group in the molecule, are obtainable by well known methods and in the simplest way by direct reaction of the halogens upon the ketones. As initial materials of the kind suitable for the present method we may use, e. g., chloro-acetone, bromo-acetone, bromo-methyl-ethyl-ketone, ω-chloro-acetophenone, ω-chloro-α-propiophenone, α-chloroacetyl-naphthalin and the like.

The conversion of the halogen-ketones with the higher molecular organic hydroxyl-compounds is performed by methods known in themselves, in such a way that metal-compounds and particularly alkali- or earth-alkali metal-compounds of the hydroxyl-compounds are converted under warming with the halogen-ketones, if necessary in the presence of solvents, whereupon the thus obtained condensation products are separated from the formed metal-halides in the usual manner.

The conversion of the halogen-ketones with the higher molecular mercapto- and amino compounds or substituted amino-compounds respectively (substituted on the nitrogen) is likewise performed according to the usual methods and preferably in the presence of appropriate solvents or diluents and also in the presence of acid-binding agents such as sodium acetate, alkali- or earth-alkali-carbonates, -oxides or -hydroxides, pyridine and the like.

The condensation products containing ketone-groups are subsequently subjected to the reduction whereby the ketone group is transformed into a secondary alcohol group. For this reducing-process we avail ourselves of usual methods and preferably of the catalytic hydrogenation in the presence of hydrogenation-catalysts such as copper or nickel. If the compounds to be reduced are sulfur-bearing it is advantageous to employ for the hydrogenation sulfur-fast catalysts, e. g., molybdenum catalysts. The catalytic hydrogenation is performed at a higher temperature usually above 80° C. and under pressure. If the compounds to be reduced contain any aromatic residues we are further in a position to modify accordingly the hydrogenation-conditions and particularly by raising the reaction-temperatures (up to appr. 200° C.) to provoke a saturation of the aromatic group present in the condensation-product with hydrogen; to do so we avail ourselves preferably of nickel or other catalysts adapted for the hydrogenation of aromatic cyclic systems. It is practicable to perform the catalytic hydrogen-treatment of the aromatic residue of the condensation-compound either during the catalytic reduction of the ketone group of this compound or subsequently or, respectively, at a later stage of the process.

The secondary alcohols obtained in this way are then subjected to a treatment with agents capable of reacting at the hydroxyl group and of rendering the total molecule soluble in water. Thus we are in a position to introduce, e. g., sulfonic acid groups, sulfuric acid ester groups, thio-sulfuric acid ester groups, phosphoric acid ester groups, carboxyl groups, polyoxy-and/or polyether groups and the like by following usual methods, e. g., by the treatment with sulfonating agents such as sulfuric acid, chloro-sulfonic acid and the like or by the esterification with other suitable polyvalent mineral acids, by the treatment with one or several mols of alkylene-oxides such as ethylene-oxide, polyvalent alcohols such as glycerine, sugars, etc., ether-alcohols, e. g., poly-glycol, poly-glycerine and the like, by the esterification or alkoxylation respectively with polybasic carbonic acids such as oxalic acid, adipic acid, sulfo-phthalic acid etc. or with carbonic acids containing mono-basic or poly-basic oxy-groups, or also by the esterification with halogen-carbonic acids with subsequent replacement of the halogen atom or halogen atoms respectively by groups having the property of imparting water solubility such as the —$SO_3H$—, —S—$SO_3H$—, quarternary ammonium- or betaine-groups. In certain cases we are also in a position to combine those operations in a way known in itself, e. g., in performing first a treatment with ethylene-oxide, and then in sulfonating on the formed hydroxy-ether group.

The compounds obtained by following the present method show surface-active properties and in industrial processes, e. g., in the washing-, textile-, leather-, furriery-, paper-industries and the like they are advantageously used as wetting-, washing-, deterging-, emulsifying- and dispersing-agents.

Example 1

208 weight parts of sodium-lauryl alcoholate (made in the usual way from lauryl-alcohol by means of NaOH, NaNH$_2$ or Na-metal) and 92 weight parts of chloro-acetone are treated on the water-bath for several hours under vigorous stirring and preferably in the presence of a diluent such as xylol, whereby the lauroxy-acetone is developed upon precipitation of sodium chloride. After being worked up this ketone is subjected to hydrogen treatment at about 100° C. and appr. 50 atms. above gauge pressure, in the presence of a nickel-catalyst, whereby the ketone is reduced to the corresponding secondary alcohol of the formula $CH_3-CH(OH)-CH_2-O-C_{12}H_{25}$. Now 122 weight parts of this alcohol are dissolved in 450 weight parts of ether or $\beta\beta$-dichloro diethyl-ether and sulfonated, under cooling, with 60 weight parts of chloro-sulfonic acid. After neutralizing with sodium hydroxide we obtain the sodium salt of the sulfonation-product which is soluble in water. While in an aqueous solution it shows soaplike properties.

Instead of the sodium-lauryl-alcoholate we may in the present example also employ corresponding amounts of sodium alcoholate obtained from the mixture of the cocoaoil fatty alcohols or of the sperm oil fatty alcohols as initial material; the sulfonation may be performed inter alia also by means of addition-products of SO$_3$ on tertiary bases such as pyridine.

The conversion of the secondary alcohol obtained according to the present example into a water soluble compound may also be done by treating 122 weight parts of the alcohol in an altoclave stirring and under adding 1% of caustic soda with 300 weight parts of ethylene oxide; for this operation the temperature is brought to appr. 125° C. and kept until any excessive pressure has ceased. The thus obtained condensation-product constitutes a viscous mass soluble in water.

Example 2

242 weight parts of the sodium derivative of the sec.-octyl-o-cresol (obtained from 1,2-octene and o-cresol in a usual way) and 92 weight parts of chloro-acetone are treated on the water-bath for several hours while stirring, in the presence of an indifferent diluent such as xylol until sec.-octyl-cresoxy-acetone is formed upon precipitation of sodium chloride. After being worked up this ketone is subjected to the hydrogen-treatment at about 75° C. and appr. 35 atms. above gauge pressure, in the presence of a copper-catalyst, whereby the ketone group is reduced to a secondary alcohol group. 133 weight parts of this alcohol of the formula

$C_8H_{17}.C_6H_3(CH_3)O.CH_2.CH(OH).CH_3$ are dissolved in 300 weight parts of ether and sulfonated under cooling with 65 weight parts of chloro-sulfonic acid. After neutralizing with sodium hydroxide we obtain, by working-up, the sodium salt of the sulfonation-product, which is soluble in water. While in an aqueous solution it shows soaplike properties.

Instead of the sodium derivative of the sec.-octyl-o-cresol we may in the present example also employ corresponding amounts of the sodium derivative of the di-isobutyl-phenol or also corresponding amounts of the sodium derivative of the condensation-product from techn.o-cresol and a synthetic hydrocarbon-fraction (average mol. weight 107, iodine number 84) obtained from carbon-oxide and hydrogen.

The conversion of the secondary alcohol, obtained by following the present example, into a water soluble compound may also be performed by treating 133 weight parts of this alcohol in the autoclave under stirring and in the presence of 0.5% of caustic soda, with 280 weight parts of ethylene-oxide, whereupon the temperature is brought to about 125° C. and kept until any excessive pressure has ceased. The thus obtained condensation-product is worked up in the usual manner.

Example 3

245 weight parts of the alcoholate produced in the wellknown way from sodium and perhydro-4-sec.-octylphenol are heated together with 106 weight parts of chloro-butanone-(2), as specified in Example 1, until the precipitation of sodium chloride is complete. The octyl-cyclohexyl-oxy-butanone obtained during the working-up, yields upon catalytic hydrogenation the corresponding secondary alcohol, which on sulfonation with an amount of chloro-sulfonic acid equal to half of its weight gives at 30 to 40° C. a water soluble product, which after the working-up in the usual way and after the neutralization with sodium lye, ammonia or organic bases, constitutes an excellent wetting-, washing- and dispersing-agent.

We claim:

1. The method for the production of capillary active compounds characterized by condensing higher molecular fatty alcohols with halogen-ketones of the group consisting of chloroacetone, bromoacetone, bromomethyle-ethyl-keton, $\omega$-chloroacetophenone, $\omega$-chloro-$\alpha$-propiophenone, $\alpha$-chloroacetylnaphtalene, subjecting to reduction in the obtained condensation product the keto group to a secondary alcohol group and converting the alcohol group into a group which produces solubility in water.

2. The method for the production of capillary active compounds characterized by condensing higher molecular fatty aromatic hydroxyl-compounds of the general formula R—Ar—OH, in which R means at least one of aliphatic, cycloaliphatic, aliphatic-cycloaliphatic and aliphatic aromatic residues and Ar means an aromatic residue, with halogen-ketones of the group consisting of chloroacetone, bromoacetone, bromomethyl-ethyl-keton, $\omega$-chloroacetophenone, $\omega$-chloro-$\alpha$-propiophenone, $\alpha$-chloroacetylnaphtalene, subjecting to reduction in the obtained condensation product the keto group to a secondary alcohol group and converting the alcohol group into a group which produces solubility in water.

3. The process of preparing capillary active compounds which comprises condensing a higher molecular fatty alcohol with a halogen ketone, reducing the resulting condensation product whereby the keto group therein is converted into a secondary alcohol group, and introducing a group which produces solubility in water by reaction with the secondary alcohol group.

4. The process described in claim 3 wherein the reaction introducing the group producing solubility in water is a sulfonation reaction.

5. The method for the production of capillary active compounds characterized by condensing higher molecular fatty alcohols with chloroacetone, subjecting the keto group in the obtained condensation product to reduction to a secondary alcohol group and reacting the resulting compound at the alcohol group with a sulfonating agent.

6. The method for the production of capillary active compounds characterized by condensing higher molecular fatty alcohols with chloroacetone, subjecting the keto group in the condensation product obtained to reduction to a secondary alcohol group and reacting the compound obtained at the alcohol group with an alkylene oxide.

WINFRID HENTRICH.
ALFRED KIRSTAHLER.
FRITZ SCHLEGEL.